(12) United States Patent
Schlipf

(10) Patent No.: US 7,647,753 B2
(45) Date of Patent: Jan. 19, 2010

(54) HEADER HEIGHT CONTROL SYSTEM AND METHOD

(75) Inventor: Robert Schlipf, Milford, IN (US)

(73) Assignee: Headsight, Inc., Bremen, IN (US)

( * ) Notice: Subject to any disclaimer, the term of this patent is extended or adjusted under 35 U.S.C. 154(b) by 0 days.

(21) Appl. No.: 11/966,605

(22) Filed: Dec. 28, 2007

(65) Prior Publication Data

US 2008/0155954 A1 Jul. 3, 2008

Related U.S. Application Data

(60) Provisional application No. 60/882,920, filed on Dec. 30, 2006.

(51) Int. Cl.
*A01D 41/14* (2006.01)
*A01D 46/08* (2006.01)
*A01D 75/28* (2006.01)

(52) U.S. Cl. .................................. 56/10.2 E

(58) Field of Classification Search ............... 56/10.2 E, 56/208, DIG. 15
See application file for complete search history.

(56) References Cited

U.S. PATENT DOCUMENTS

| | | | |
|---|---|---|---|
| 3,137,984 A | 6/1964 | Shonkwiler |
| 3,196,599 A | 7/1965 | Meiners et al. |
| 3,498,037 A | 3/1970 | Hobson et al. |
| 3,568,420 A | 3/1971 | Freidrich-Wilhelm Hofer et al. |
| 3,611,686 A | 10/1971 | Van Antwerp |
| 3,623,301 A | 11/1971 | Freidrich-Wilheim Hofer |
| 3,704,574 A | 12/1972 | Gardner |
| 3,707,834 A | 1/1973 | Schumaker, II et al. |
| 3,722,193 A | 3/1973 | Strubbe |
| 3,747,311 A | 7/1973 | DeCoene, et al. |
| 3,851,451 A | 12/1974 | Agness et al. |
| 3,886,718 A | 6/1975 | Talbot |
| 3,908,345 A | 9/1975 | Oni et al. |
| 3,953,959 A | 5/1976 | Decruyenaere |
| 4,064,945 A | 12/1977 | Haney |
| 4,136,508 A | 1/1979 | Coleman et al. |
| 4,147,016 A | 4/1979 | Jensen et al. |
| 4,193,250 A | 3/1980 | Kessens et al. |
| 4,199,925 A | 4/1980 | Quick et al. |

(Continued)

FOREIGN PATENT DOCUMENTS

WO WO84/04652 12/1984

*Primary Examiner*—Árpád Fábián-Kovács
(74) *Attorney, Agent, or Firm*—Larkin Hoffman Daly & Lindgren Ltd.; Thomas J. Oppold

(57) ABSTRACT

A header height control system and a method for improving the responsiveness of a header height control system. A height sensor is disposed with respect to the header to generate a signal varying in magnitude with respect to changes in distance between a preestablished point on the header and the ground. The magnitude of the generated signal when the header is at a predefined set point is determined. For generated signal magnitudes indicating the header is below the set point, the signal magnitudes are operably modified by applying a gain value. For generated signal magnitudes indicating the header is above the set point, the signal magnitudes may be modified by applying a different gain value. The application of a gain value or different gain values depending on the height of the header above or below the set point improves the responsiveness of the header height control system to changes in terrain.

33 Claims, 6 Drawing Sheets

U.S. PATENT DOCUMENTS

| | | | |
|---|---|---|---|
| 4,204,383 | A | 5/1980 | Milliken, Jr. |
| 4,211,057 | A | 7/1980 | Dougherty et al. |
| 4,227,363 | A | 10/1980 | Kerber et al. |
| 4,312,177 | A | 1/1982 | Maier et al. |
| 4,332,126 | A | 6/1982 | Van Auwelaer et al. |
| 4,373,805 | A * | 2/1983 | Mallinson .................. 356/3.07 |
| 4,401,009 | A | 8/1983 | Zeuner et al. |
| 4,409,778 | A | 10/1983 | McNaught |
| 4,414,792 | A | 11/1983 | Bettencourt et al. |
| 4,437,295 | A | 3/1984 | Rock |
| 4,507,910 | A | 4/1985 | Thornley et al. |
| 4,541,229 | A | 9/1985 | Elijah |
| 4,573,124 | A | 2/1986 | Seiferling |
| 4,594,840 | A | 6/1986 | D'Almeida et al. |
| 4,612,757 | A | 9/1986 | Halls et al. |
| 4,622,803 | A | 11/1986 | Lech |
| 4,641,490 | A | 2/1987 | Wynn et al. |
| 4,733,355 | A | 3/1988 | Davidson et al. |
| 4,747,260 | A | 5/1988 | Petrasch et al. |
| 4,757,673 | A | 7/1988 | Gayman |
| 4,776,153 | A | 10/1988 | DePauw et al. |
| 4,845,931 | A | 7/1989 | Bruner et al. |
| 4,942,724 | A | 7/1990 | Diekhans et al. |
| 5,090,184 | A | 2/1992 | Garter et al. |
| 5,115,628 | A | 5/1992 | Garter et al. |
| 5,123,234 | A | 6/1992 | Harada et al. |
| 5,155,984 | A | 10/1992 | Sheehan |
| 5,195,309 | A | 3/1993 | Mossman |
| 5,351,601 | A | 10/1994 | Zeuner et al. |
| 5,355,773 | A | 10/1994 | Winkels |
| 5,359,836 | A | 11/1994 | Zeuner et al. |
| 5,455,769 | A | 10/1995 | Panoushek et al. |
| 5,463,854 | A | 11/1995 | Chmielewski, Jr. et al. |
| 5,469,694 | A | 11/1995 | Panoushek et al. |
| 5,471,823 | A | 12/1995 | Panoushek et al. |
| 5,471,825 | A | 12/1995 | Panoushek et al. |
| 5,535,577 | A | 7/1996 | Chmielewski et al. |
| 5,577,373 | A * | 11/1996 | Panoushek et al. ........ 56/10.2 E |
| 5,704,200 | A | 1/1998 | Chmielewski, Jr. et al. |
| 5,713,190 | A * | 2/1998 | Vermeulen et al. ........ 56/10.2 E |
| 5,794,421 | A | 8/1998 | Maichle |
| 5,809,862 | A | 9/1998 | Dallman |
| 5,937,621 | A | 8/1999 | Eggenhaus |
| 5,957,218 | A | 9/1999 | Noonan et al. |
| 6,041,583 | A | 3/2000 | Goering et al. |
| 6,202,395 | B1 | 3/2001 | Gramm |
| 6,289,659 | B1 * | 9/2001 | Fox .......................... 56/10.2 E |
| 6,389,785 | B1 | 5/2002 | Diekhans et al. |
| 6,516,595 | B2 | 2/2003 | Rhody et al. |
| 6,523,333 | B2 | 2/2003 | Metzger |
| 6,530,197 | B1 | 3/2003 | Christensen et al. |
| 6,588,187 | B2 | 7/2003 | Engelstad et al. |
| 6,594,978 | B2 | 7/2003 | Viaud |
| 6,615,570 | B2 | 9/2003 | Beck et al. |
| 6,726,559 | B2 | 4/2004 | Bischoff |
| 6,758,029 | B2 | 7/2004 | Beaujot |
| 6,813,873 | B2 | 11/2004 | Allworden et al. |
| 6,826,894 | B2 | 12/2004 | Thiemann et al. |
| 6,871,483 | B1 * | 3/2005 | Panoushek ............... 56/10.2 E |
| 6,883,299 | B1 | 4/2005 | Gramm |
| 6,918,237 | B2 | 7/2005 | Shidler et al. |
| 7,222,474 | B2 * | 5/2007 | Rayfield et al. ........... 56/10.2 E |
| 7,310,931 | B2 * | 12/2007 | Gramm ....................... 56/208 |
| 2002/0069628 | A1 * | 6/2002 | Metzger .................. 56/10.2 E |

\* cited by examiner

HEADER HEIGHT CONTROL SYSTEM AND METHOD

BACKGROUND

The prior art is replete with various systems for detecting the height of a combine header above the ground surface and for automatically adjusting the header height during harvesting operations to follow the contours of the field. While each of these prior art systems may serve their intended purpose and while each may perform adequately under most circumstances, heretofore, there have been no header height control systems that can provide the necessary sensitivity and responsiveness needed for corn headers when the crop divider snouts are being run at or near the ground in an effort to pick up "downed" corn, i.e., when the corn stalks are lying on the ground due to wind storms or other circumstances.

U.S. Pat. No. 6,202,395 to Gramm (hereinafter "Gramm '395") and U.S. Pat. No. 6,523,333 to Metzger (hereinafter Metzger '333), both of which are hereby incorporated herein in their entirety by reference, describe the need for automatically controlling header height and the advantages achieved through the use of height sensors mounted near the snout tips of the header. In both Gramm '395 and Metzger '333 the height sensors generate output signals of varying magnitude based on the rotational position of the sensing arm relative to the crop divider snout. The electrical output signals from the height sensors are communicated to the combine's header control system to automatically actuate the combine's hydraulics to raise and lower the header in response to the output signals of the height sensor. Neither Gramm '395 nor Metzger '333, however, discuss the effects of the sensitivity or responsiveness of the height sensor when the crop divider snouts are being run at or near the ground.

Although it is advantageous to place height sensors near the tips of the snouts for the reasons disclosed in Gramm '395 and Metzger '333, it should be appreciated that after the snout tips touch the ground and the rest of header continues to be lowered, the actual header height will no longer have the same near-linear proportionality to the movement of the height sensing arms because the height sensor arm will rotate very little relative to the snout to which it is mounted. As a result, a larger effective "dead band" is developed at the most critical operating heights of the header, thereby increasing likelihood of impact of the header with the ground surface or the undesired loss of crop should the operator choose instead to raise the header to avoid the chance of ground impact. Even with the proportional header control systems available on late model combines which cause the headers to raise quicker when the height sensors indicate abrupt ground elevation changes, the responsiveness of such proportional systems is still compromised when the snouts are being run at ground level due to the limited rotational movement of the height sensor at such positions.

Accordingly, there is a need for a header height control system that takes advantage of a height sensor located as far forward on the crop dividing snout as practicable to allow earlier ground sensing so as to provide maximum warning time for the header height control system to respond to terrain changes, while at the same time improving the responsiveness of the control system when the header is being run at or near the ground surface.

DETAILED DESCRIPTION

Figure 1:
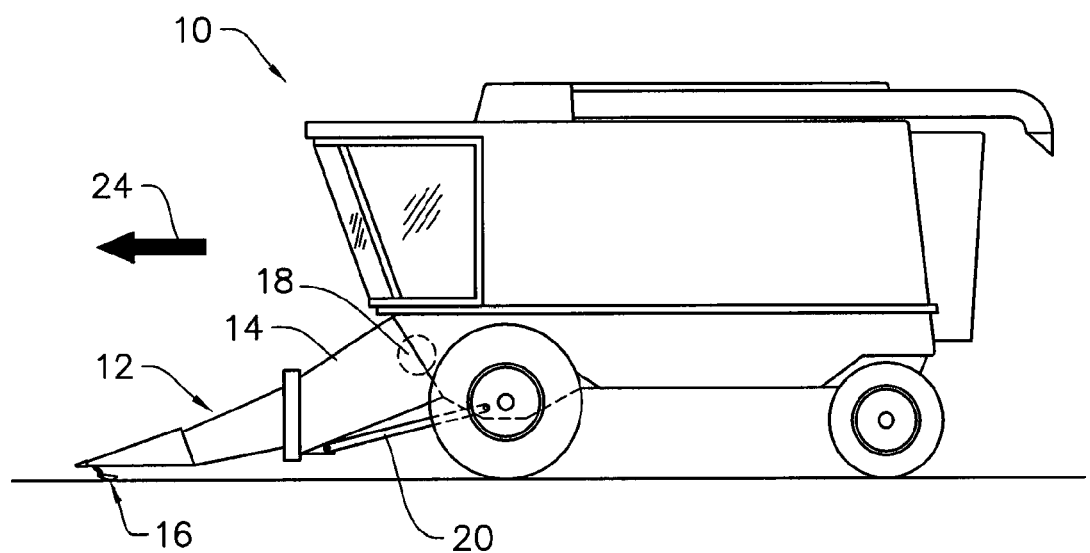
FIG. 1 illustrates a conventional combine with a corn header mounted thereon and showing a height sensor in the form of a height sensing arm mounted near a snout tip of the corn header.

Referring now to the drawings, wherein like reference numerals designate identical or corresponding parts throughout the several views, FIG. 1 illustrates a conventional combine harvester indicated generally by reference numeral 10 having a corn header 12 mounted thereon in a conventional manner to the forwardly extending feeder house 14. A height sensor 16 (discussed later) is preferably mounted near the snout tip of the corn header 12. As is conventional, the rearward end of the feeder house 14 is pivotally connected to the main body of the combine 10 as represented by pivot point 18. As is also conventional, hydraulic cylinders 20 are pivotally connected at one end to the main body of the combine 10 and at their other end to the forward end of the feeder house 14. Thus, it should be appreciated that by actuating the cylinders 20, the feeder house 14 and the header 12 mounted thereto may be raised and lowered substantially vertically, but in a broad arc about the pivot point 18.

It should be understood that each side of the header typically has a height sensor to sense changes in terrain elevation from one side of the header to the other. The two height sensors cooperate to effect header height changes and/or lateral tilt to prevent either side of the header from impacting the ground if the ground elevation is higher on one side versus the other. For example, depending on whether the combine permits the header to tilt, the output of one of the height sensor may cause the entire header to raise or lower, or it may cause only one side of the header to raise and lower to account for terrain variations across the width of the header. Furthermore, on particularly wide headers, intermediate height sensors may be employed near the middle of the header that cooperate with the height sensors on either side to effect header height changes if the terrain elevation in the middle of the header varies from the elevation at the sides of the header.

Figure 2:
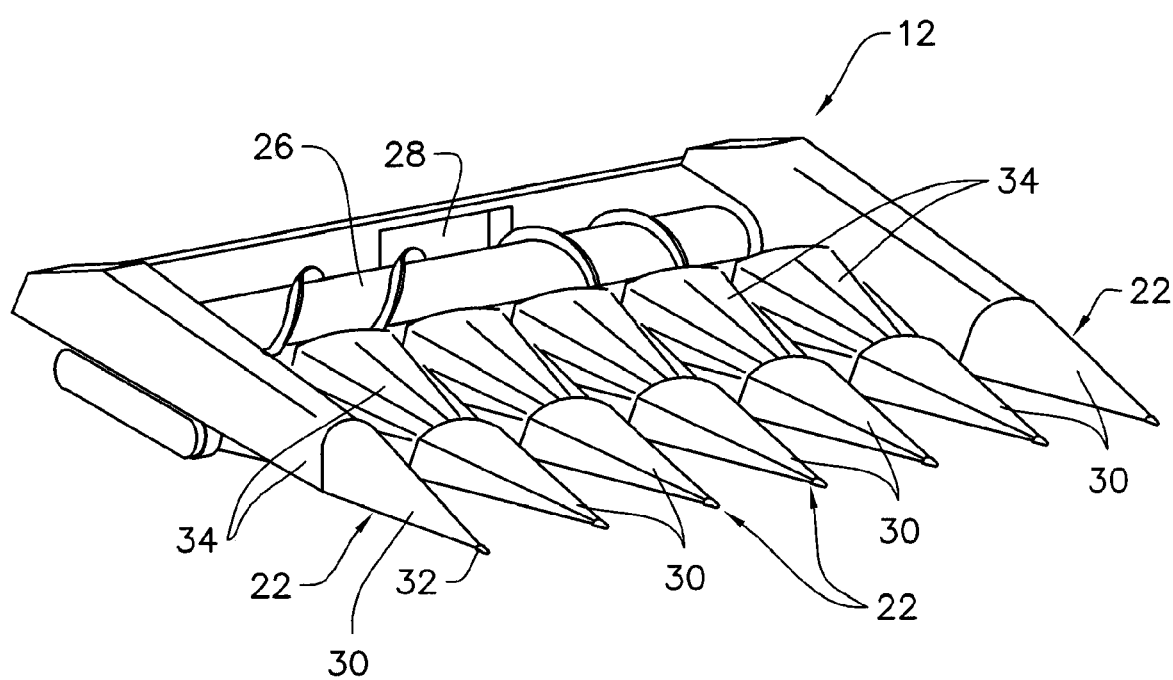
FIG. 2 is a perspective view of a typical corn header.

FIG. 2 illustrates a typical corn header 12. The header 12 includes a plurality of crop dividers 22. In the example of FIG. 2, the header 12 is illustrated as a six-row header, in that there are six spaces formed between the rearwardly converging crop dividers 22 into which the rows of the crop to be harvested are gathered. Header widths may vary and typically range from four rows up to twelve or more rows. In operation when harvesting corn, as the combine is driven forwardly as indicated by arrow 24 in FIG. 1, the corn stalks will be gathered between the rearwardly converging crop dividers 22. As the combine proceeds forwardly, the ears are stripped from the stalks and the loose ears, husks and other gathered crop debris are augured toward the central area of the header 12 by the rotating transverse auger 26. The ears and other gathered crop debris then pass through the central opening 28 in the back of the header 12 where it is then conveyed by the feeder house 14 into the interior of the combine. Within the body of the combine, the ears of corn are husked and shelled. The husks, the shelled cobs, and other unwanted crop debris is discharged out the rear of the combine while the shelled corn kernels are augured into a temporary holding tank until being unloaded.

Figure 3:
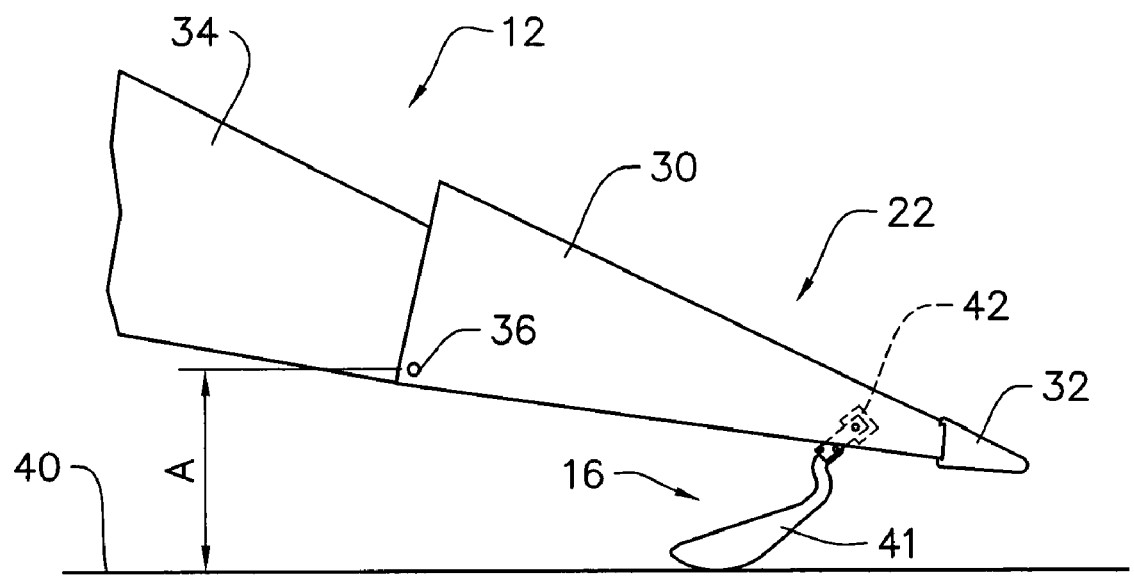
FIG. 3 is a side elevation views of the corn header of FIGS. 1 and 2 shown at Set Point A.
Figure 4:
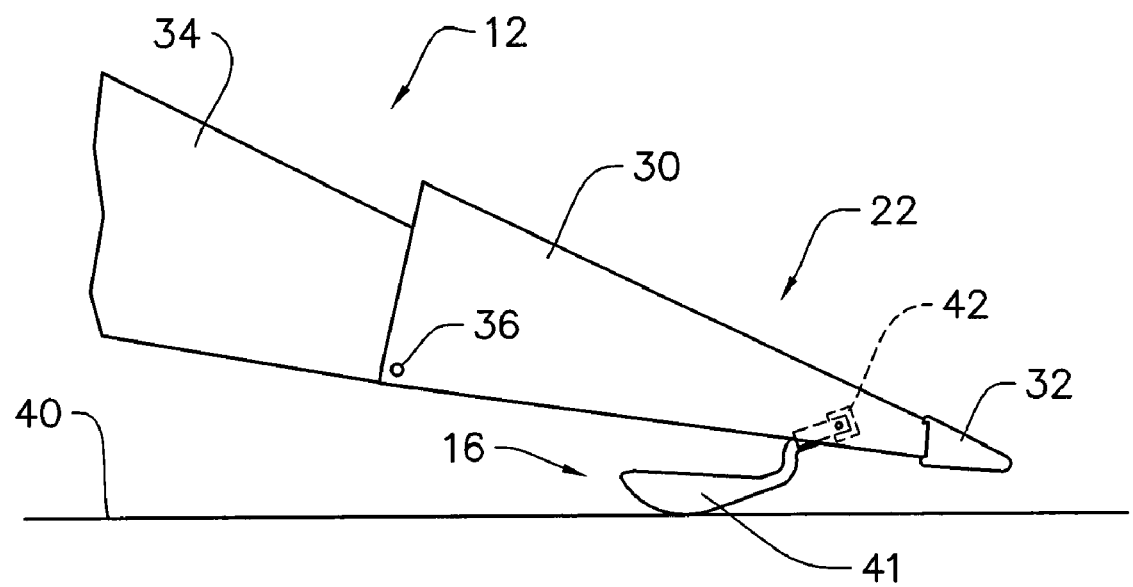
FIG. 4 is a side elevation view of the corn header of FIG. 3 illustrating the pivoting movement of the height sensing arm as the header is lowered toward the ground.

Referring to FIGS. 2 and 3, and as disclosed in U.S. Pat. No. 5,195,309 to Mossman, which is incorporated herein in its entirety by reference, each crop divider 22 comprises a semi-conical forward portion or snout 30 and a semi-cylindrical rearward portion 34. Each snout 30 typically includes a hardened or impact resistant point or tip 32. The semi-conical snout 30 is pivotally mounted by bolts or pins 36 (FIG. 3) to the semi-cylindrical rearward portion 34 which is fixed relative to the rest of the header. FIGS. 3-6 illustrate the ability of the snouts 30 to pivot with respect to the fixed rear portions 34 about the pin 36 as indicated by arrow 38 (FIGS. 5-6) when the snout tip 32 contacts the ground surface 40. A stop (not shown) prevents the snout 30 from pivoting downwardly past the general angle of the rearward portion 34.

As best illustrated FIGS. 3-7, disposed below the header 12 and preferably mounted near the tip 32 of the snout 30 is the height sensor 16. The preferred height sensor 16 comprises a spring-biased arm 41 to which is secured a rotational sensor 42 at a forward end thereof. The rotational sensor 42 may be a potentiometer or any other electronic or magnetic height sensor capable of generating an output signal in response to the angular or linear position of the arm 16. A preferred embodiment of a spring-biased arm with rotational sensor is distributed by Headsight, Inc., 3529 Fir Road, Bremen, Ind. 46506. A non-spring biased arm such as disclosed in Metzger '333, and other types of height sensors, including non-contact height sensors, such as ultrasonic sensors, may be used in connection with the system and method of the present invention.

Figure 5:
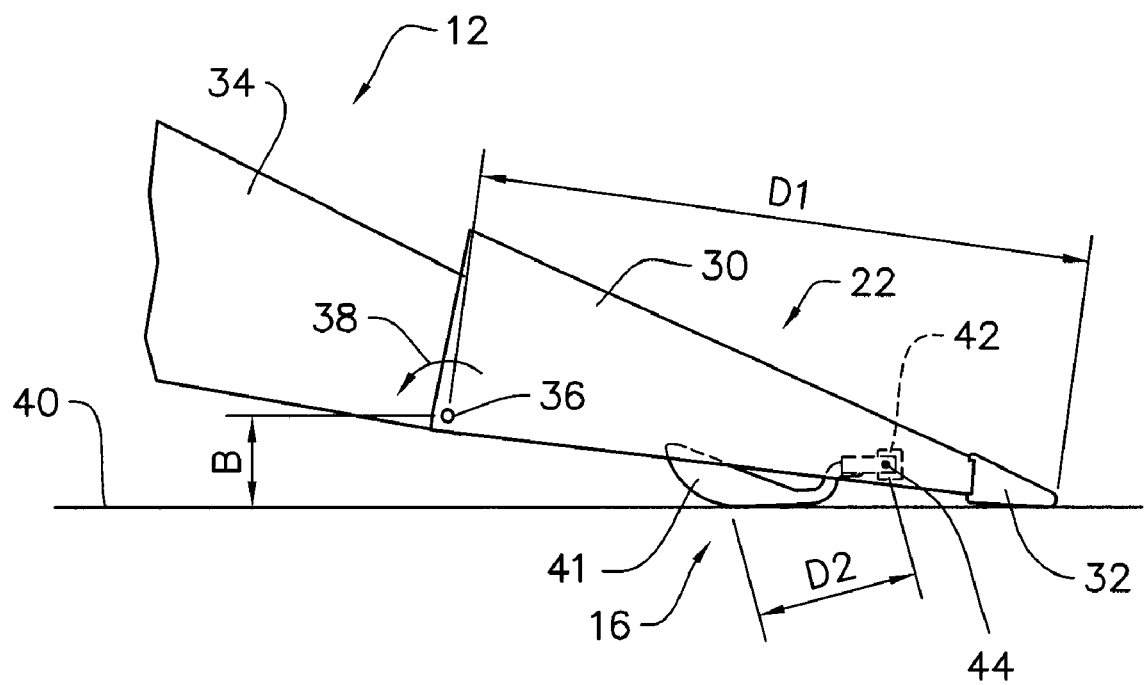
FIG. 5 is a side elevation view of the corn header of FIG. 4 illustrating further pivoting movement of the height sensing arm as the header is further lowered toward the ground to Set Point B and illustrating dimensions D1 and D2 used in one method for determining the gain value.
Figure 6:
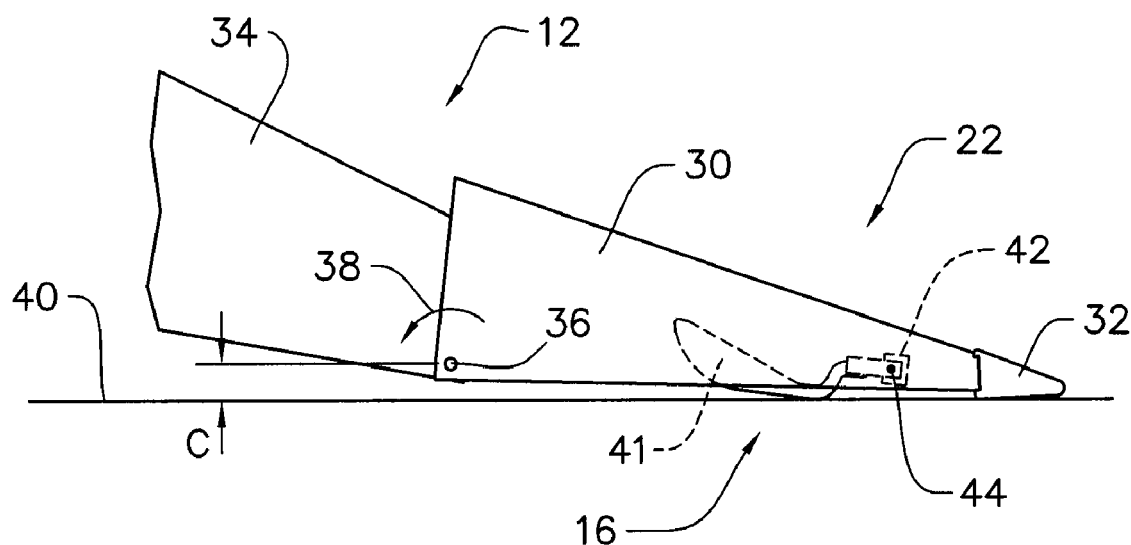
FIG. 6 is a side elevation view of the corn header of FIG. 5 illustrating further pivoting movement of the height sensing arm as the header is further lowered toward the ground to Set Point C and illustrating the pivoting movement of the crop-divider snouts after the snout tips contact the ground.
Figure 7:
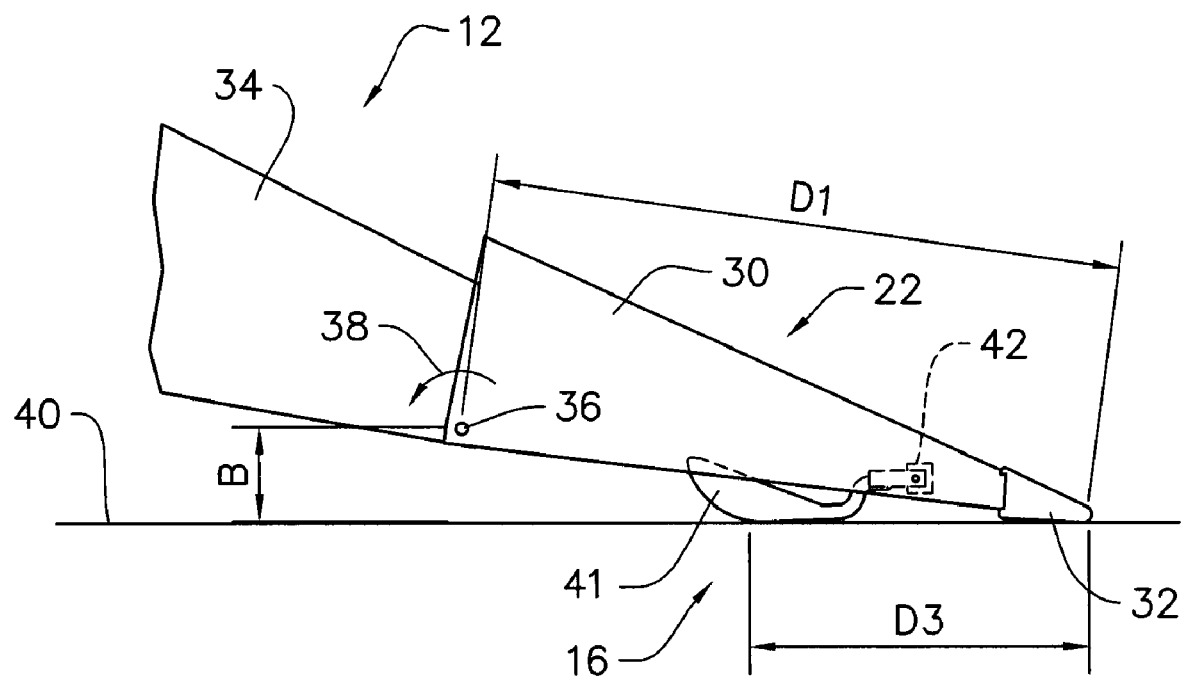
FIG. 7 is another side elevation view of the corn header substantially the same as in FIG. 5 and illustrating dimensions D1 and D3 used in a preferred method for determining the gain value.
Figure 8:
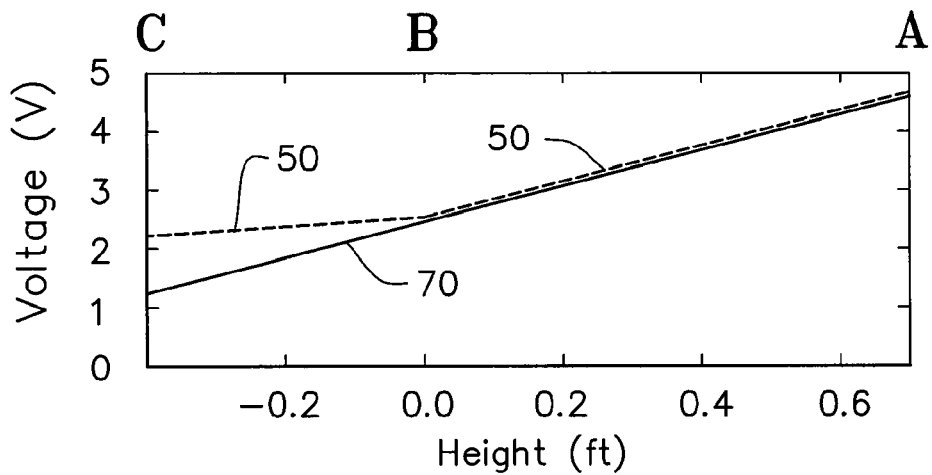
FIG. 8 is a diagram representing the change in voltage output of the height sensor in relation to the header height above the ground surface as illustrated in FIGS. 3-7. The solid line represents the modified voltage output between points A, B and C when the system and method of the present invention is used versus the unmodified voltage output (dashed line) when the system and method of the present invention is not used.

In the preferred embodiment, the rotational sensor 42 generates a voltage signal of varying magnitude in relation to the rotational position of the arm 16 with respect to the header, thereby establishing a generally proportional relationship between the height of the header 12 above the ground surface. As used herein, the term "magnitude" should be understood as meaning or including any signal value or signal characteristic generated by a height sensor that may be used for indicating header height relative to a ground surface, including voltage, current, pulse width, etc. As illustrated in FIG. 8, a plot of the output voltage of the sensor in relation to the vertical height of the header is substantially linearly proportional to the height of the header above Set Point B which corresponds to the height of the header where the snout tip 32 makes contact with the ground surface 40 as illustrated in FIGS. 5 and 7.

As previously discussed, the snout 30 to which the arm 41 is attached is pivotable with respect to the rear portion 34 of the crop divider 22 about pin 36. Accordingly, once the snout tip 32 contacts the ground, and as the header 12 continues to be lowered below Set Point B, the snout 30 will begin to pivot about pin 36 as indicated by arrow 38 as the rear portion 34 of the crop divider 22 continues to move downwardly with the rest of the header 12. As a result, the actual header height will no longer have the same substantially linear proportionality to the rotational movement of the arm 41 because the rotation of the arm 41 will change very little relative to the snout.

Referring again to FIG. 8, a representative example of voltage output of the preferred height sensor 16 versus the height of the header corresponding to Set Points A, B and C is plotted. It should be appreciated that the plotted curve and/or linearity and slope will vary depending on the shape of the height sensing arm and/or the type of height sensor used and its position on the header. As previously identified, the Set Points A, B and C correspond to the heights of the pivot point 36 of the header above the ground surface as illustrated in FIG. 3 (Set Point A), FIGS. 5 and 7 (Set Point B) and FIG. 6 (Set Point C). Set Point A may be any point or height where the snout tips are not in contact with the ground surface. However, in the preferred embodiment, Set Point A corresponds to the height of the pivot point 36 nearest the ground but where the arm and rotational sensor have not yet begun to rotate (i.e., the minimum rotation angle) so that the output voltage of the rotational sensor is at its maximum. Set Point B corresponds to the height of the pivot point 36 at which the snout tip 32 makes first contact with a substantially level ground surface 40. Set Point C refers to the height of the pivot point 36 when the skids on the header frame touch the ground.

The determination of when the header reaches Set Point B (i.e., when the tip touches the ground) may be determined visually or it may be determined automatically by employing another sensor. For example, one method of automatic determination of when Set Point B is reached may utilize a rotational sensor disposed at the pivot point 36 (or some other point) to generate an electrical signal when the snout 30 begins to rotate with respect to the rear portion 34 of the crop divider due to ground contact of the snout tip 32. Yet another method of automatic determination of when Set Point B is reached may utilize a contact sensor. For example, when the snout begins to rotate an electrical contact may connect or disconnect thereby generating an electrical signal to indicate that the snout 30 has begun to rotate due to ground contact. Set Point C may also be determined visually or automatically by employing additional sensors similar to those described for automatically determining Set Point B.

As illustrated in FIG. 8, the scale range of the voltage output of the preferred height sensor 16 (specifically the rotational sensor 42) is between 0 to 5 volts because most conventional header control systems accept voltage inputs between 0.5 volts and 4.5 volts. Accordingly, in the preferred embodiment, the output voltage at Set Point A of the rotational sensor is preferably about 4.4 volts, which is within the 4.5 maximum voltage range accepted by most header control systems, while also allowing a slight margin for error. However, the present invention should not be construed as being limited to any particular magnitude of signal ranges. The scale of the horizontal axis ranges from 0.6 feet (approximately seven inches) above Set Point B to −0.4 feet (approximately five inches) below Set Point B. Again, the present invention should not be construed as being limited to any particular header height ranges above or below Set Point B. As indicated by dashed line 50, the plotted voltage output to header height between points A and B is substantially linear. However, as the header continues to move downwardly beyond Set Point B, the slope of the dashed line 50, changes significantly.

Figure 9:
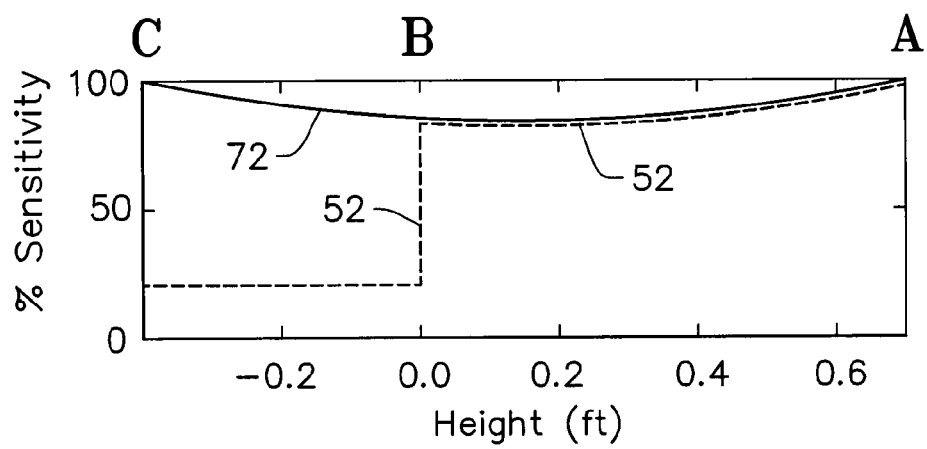
FIG. 9 is a diagram representing the change in sensitivity as a percentage of the overall sensitivity of the height sensor in relation to the header height above the ground surface as illustrated in FIGS. 3-7. The solid line represents the modified sensitivity between points A, B and C when the system and method of the present invention is used versus the unmodified sensitivity (dashed line) when the system and method of the present invention is not used.

The diagram of FIG. 9 is similar to FIG. 8 except that instead of plotting the output of the arm height sensor 42 in volts versus height, the sensor output is plotted to show the sensitivity of the sensor versus height. Again, it should be appreciated that the plotted curve and/or linearity and slope will vary depending on the shape of the height sensing arm and/or the type of height sensor used and its position on the header. As illustrated, the plot of the sensitivity of the sensor versus header height as represented by dashed line 52 remains substantially constant between points A and B, but beyond point B, the sensitivity drops dramatically (to as low as 20% of the maximum) due to the pivoting of the snout.

Figure 10:
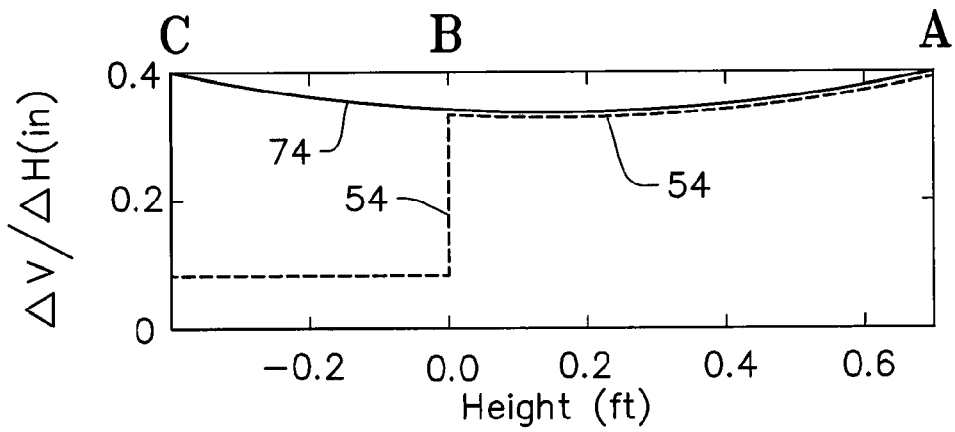
FIG. 10 is another diagram representing the change in voltage per change in height ($\Delta V/\Delta H$) of the height sensor in relation to the header height above the ground surface as illustrated in FIGS. 3-7. The solid line represents the modified $\Delta V/\Delta H$ between points A, B and C when the system and method of the present invention is used versus the unmodified $\Delta V/\Delta H$ (dashed line) when the system and method of the present invention is not used.

FIG. 10 is another diagram plotting the sensor sensitivity with a vertical scale ranging from 0 to 0.4 $\Delta V/\Delta H$. Again, it should be appreciated that the plotted curve and/or linearity and slope will vary depending on the shape of the height sensing arm and/or the type of height sensor used and its position on the header. As illustrated, the sensitivity of the sensor, as represented by dashed line 54, remains substantially constant between points A and B, but below point B, the sensitivity drops dramatically due to the pivoting of the snout.

Figure 11:
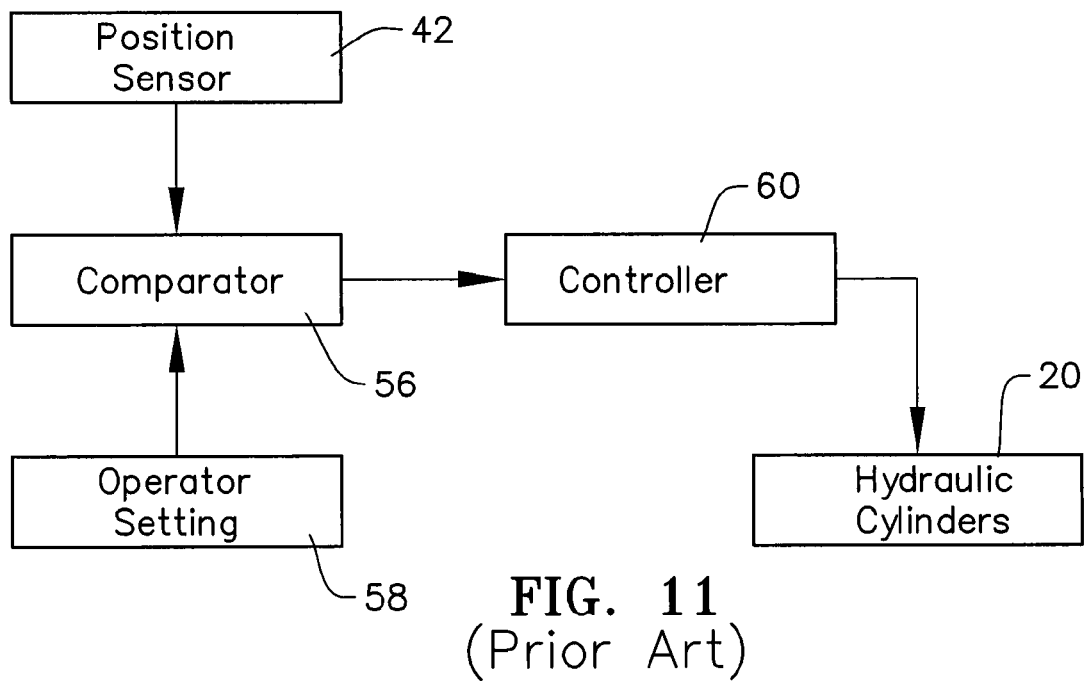
FIG. 11 is a functional block diagram of a prior art control system for raising and lowering a header.

FIG. 11 illustrates a conventional header height control system such as disclosed in Metzger '333 (previously incorporated herein by reference) to which the system and method of the present invention may be applied. As disclosed in Metzger '333, the sensor 42 responsive to the position of the arm 16, generates an output signal that is correlated to the position of the arm 16. The output signal is fed to a comparator 56 which also is capable of receiving a signal from the operator setting control 58 establishing the operator's desired operating height for the header (hereinafter the "Set Height") typically set by manipulation of a lever or rotary control in the cab of the combine. The comparator 56 will generate an output signal (hereinafter the "Comparator Output") representative of (i.e., proportional to) the difference between the height of the header sensed by the rotational sensor 42 (hereinafter the "Sensed Height") and the Set Height. The Comparator Output is fed to a controller 60 which operably actuates the hydraulic cylinders 20 to raise and lower the header 12. It should be understood that the controller 60 may be a proportional hydraulic control typical of most late model combines, or the controller may be a non-proportional hydraulic control found on older model combines. The comparator 56 may also be incorporated into or form a part of the controller 60 and/or may otherwise be adapted to communicate with the controller 60.

It should be appreciated that with conventional header height control systems, if the Sensed Height is the same as the Set Height (or within the preset "dead band" (discussed below)), the Comparator Output will not cause the controller 60 to actuate the hydraulic cylinders 20. If the terrain inclines, causing the Sensed Height to be below the Set Height, the Comparator Output will cause the controller to actuate the hydraulic cylinders 20 to raise the header 12 until the Sensed Height equals the Set Height. Conversely, if the terrain declines causing the Sensed Height to be above the Set Height, the Comparator Output will cause the controller 60 to actuate the hydraulic cylinders 20 to lower the header 12 until the Sensed Height equals the Set Height. To prevent excessive oscillation of the controller 60 and hydraulic cylinders 20, the controllers are generally programmed or programmable with a "dead band" whereby the Comparator Output indicating only slight differences in the Sensed Height on either side of the Set Height will be ignored by the controller 60 (i.e., the controller 60 will not actuate the hydraulic cylinders 20).

It should also be appreciated that in conventional header height control systems, because the effective sensitivity of the height sensor 16 is decreased below Set Point B (due to the reduced relative motion of the sensor to the snout), as represented by dashed lines 52 and 54 in FIGS. 9 and 10 respectively, the dead band will undesirably effectively increase at this most critical height. For example, assume the operator sets the Set Height such that the snout tip is at ground level and the controller 60 is programmed or set to have a dead band of one inch on either side of the Set Height. Under these conditions, if the terrain suddenly increases by three inches, for example, due to the poor sensitivity of the height sensor 16 at this height, the sensor may not detect the change in terrain to cause the comparator 56 to generate a Comparator Output signal. Furthermore, due to the decreased effective sensitivity of the height sensor 16 at this height, the Comparator Output typically will not accurately represent the true height of the header above the ground surface. Additionally, if this inaccurate Comparator Output is still within the dead band range, the controller 60 will not actuate the hydraulic cylinders 20. Thus, under such circumstances, the header could potentially impact the ground before the controller 60 actuates the hydraulic cylinders 20 to raise the header.

Figure 12:
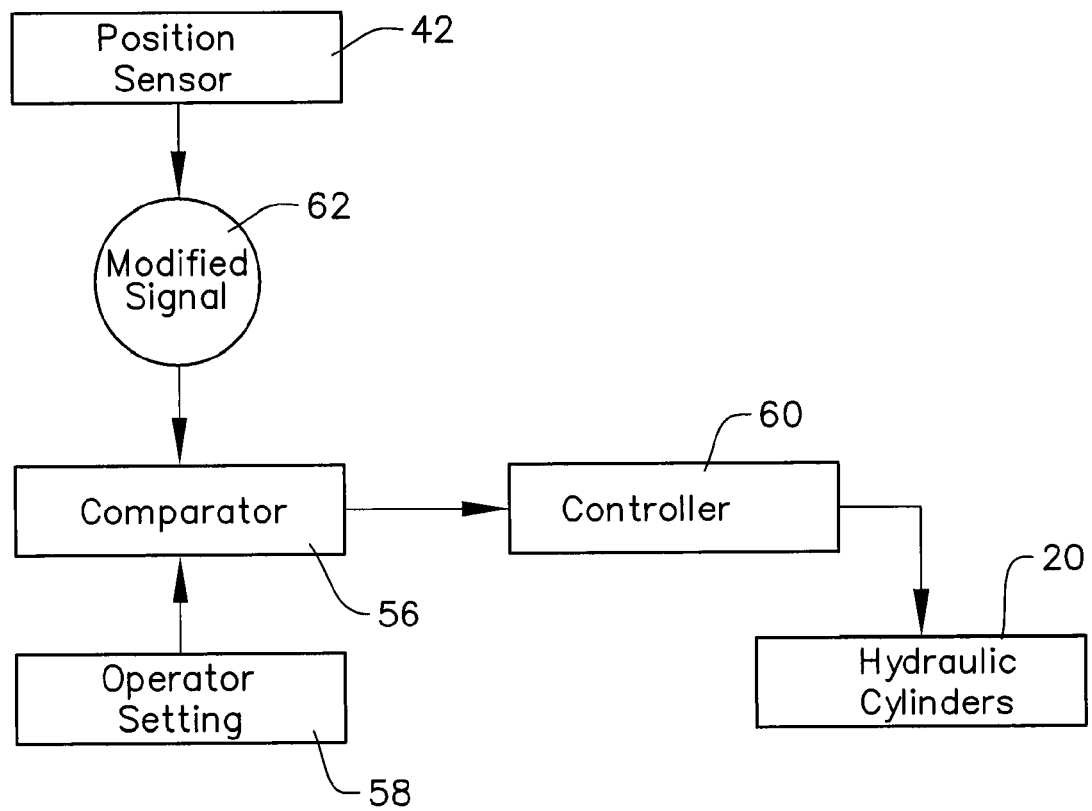
FIG. 12 illustrates one embodiment of the system and method of the present invention as applied to the control system of FIG. 11.

Accordingly, with respect to corn headers in particular, it is desirable to improve the effective sensitivity of the height sensor near and below Set Point B so as to improve the responsiveness of the header height control system when the snouts 30 are being run at or near ground level. To accomplish the desired improved responsiveness, the present invention, in its most basic form, simply modifies the magnitude of the signal indicating the header height by applying a gain or multiplier to the signal when the height of the header is detected as being at or below Set Point B. As represented in FIG. 12, the signal modification step 62 is preferably applied to the height sensor output before it reaches the comparator 56, but it should be appreciated that the signal modification step 62 may take place at any point in the header control system between the height sensor and the controller output. The signal modification step 62 could even take place at or within the height sensor itself if the sensor is capable of being programmed to apply a gain or multiplier before outputting the signal.

One method of modifying the signal is accomplished by providing a programmable digital microcontroller interface, such as the Insight™ control box available from Headsight, Inc., 3529 Fir Road, Bremen, Ind. 46506. The interface may be disposed at the rear of the harvesting header in such a location that it may be connected to the existing electronic connections on the combine's feederhouse. In another method, instead of modifying the height sensor output signal before it reaches the comparator 56/controller 60, the output of the comparator 56 and/or controller 60 may be modified by programming the controller 60 to apply the appropriate gain value and/or by calibrating the controller to effectively apply the desired gain value(s) to the signal.

In a preferred method of modifying the signal to account for the loss of effective sensitivity of the sensor below Set Point B, the magnitude of the signal when the header is at Set Point B is determined (hereinafter referred to as the "Set Point B Magnitude" (SPBM). With the SPBM known, for any signals generated by the rotational sensor that have a magnitude greater than the SPBM, it is known that the header is positioned above Set Point B. It follows, then, that if the generated signal of the rotational sensor is less than the SPBM, then the header is known to be below Set Point B. A gain or multiplier may then be applied to the signal when the signal magnitude is less than the SPBM so as to improve the responsiveness of the header height control system when the header is at or below Set Point B. If a gain or multiplier is also applied to signals having magnitudes greater than the SPBM (i.e., where the header is above Set Point B), then a larger gain factor than that applied above Set Point B should be applied to signals where the header is below Set Point B to account for the loss of effective sensitivity of the height sensor below Set Point B.

The gain used for signals above Set Point B (hereinafter the "Above B Gain" (ABG)) is preferably about one, but may be any whole or fractional number. The gain used for signals below Set Point B (hereinafter the "Below B Gain" (BBG)) is preferably more than one to around ten times greater than the ABG. The gain factor used for BBG and ABG (if any) is preferably such that, after applying the gain, the slope of the plot of the magnitude of the signal versus the header height is substantially constant across the entire height range of the header from point A to point C as indicated by the solid line 70 in FIG. 8, for example. It should be appreciated that by making the signal magnitude substantially linear across the entire height range of the header from A to C, the effective sensor sensitivity will necessarily be made substantially uniform as indicated by solid lines 72 and 74 in FIGS. 9 and 10 respectively. The gain factor used for BBG and ABG (if any) may be determined manually or automatically.

The BBG and ABG gain factors may be determined automatically by monitoring the magnitude of the sensor output signals at three points, for example, at Set Points A, B and C, to determine the difference in slope of the signal between points B to A versus between points B to C. An appropriate gain factor can then be calculated for the BBG in order to modify the slope of the signal below Set Point B (i.e., from points B to C) to have the same or substantially the same slope as the signal above Set Point B (i.e., from points B to A).

To determine the BBG gain factor manually, a preferred method utilizes the following formula:

$$BBG = ABG \times (\text{Snout Length}/\text{Sensed Distance})$$

Wherein: ABG=1

Snout Length=the distance D1 (FIG. 7) from the pivot point 36 to the snout tip 32.

Sensed Distance=the distance D3 (FIG. 7) between the snout tip 32 and the most rearward point of the sensing arm 41 in contact with the ground surface 40 when the height of the header is at Set Point B.

Alternatively, the Sensed Distance may be measured as follows:

Sensed Distance=the distance D2 (FIG. 5) between the sensor arm pivot point 44 and the most rearward point of the sensing arm 41 in contact with the ground surface 40 when the height of the header is at Set Point B.

It should be appreciated that the Sensed Distance will vary depending on the type of sensing arm 41 being used and the mounting position of the arm 41 with respect to the snout tip 32. Accordingly, this distance will typically be measured and programmed into the controller 60 during initial setup when calibrating the magnitude of the sensor output signal at Set Point B as discussed above. For non-contact sensors, such as ultrasonic sensors, the Sensed Distance would simply be the distance from the tip of the snout to the detection point or target point of the sensor. As previously identified, ABG may also be any whole or fractional number.

With the BBG and ABG gain factors known, the modified signal corresponding to header heights above Set Point B may be represented by the following equation:

$$\text{Modified Signal Above Set Point B} = \text{SPBM} + (\text{actual detected signal magnitude} - \text{SPBM}) \times \text{ABG}$$

Similarly, the modified signal corresponding to header heights below Set Point B may be represented by the following equation:

$$\text{Modified Signal Below Set Point B} = \text{SPBM} - ((\text{SPBM} - \text{actual signal magnitude}) \times \text{BBG})$$

Referring to FIG. 8 and applying the foregoing equations, the modified signal magnitudes at heights −0.2 and 0.4 may be determined. As shown in FIG. 8, the actual detected signal magnitudes at −0.2 ft and 0.4 ft are 2.4 volts and 3.8 volts, respectively. The magnitude of the signal of the height sensor at Set Point B (i.e., the SPBM) is 2.6 volts. The Above Set Point B Gain (ABG) is assumed to be 1. The Below Set Point B Gain (BBG) is calculated based on the above formula, wherein the Snout Length is 53 inches and the Sensed Distance is 15 inches. Thus, BBG=1×53/15=3.53

Accordingly, the modified signal magnitudes for the height sensor at height −0.2 ft and 0.4 ft is calculated as follows:

$$\text{Modified Signal Magnitude at } -0.2 \text{ ft} = 2.6 - ((2.6 - 2.4) \times 3.53) = 1.9$$

$$\text{Modified Signal Magnitude at } 0.4 \text{ ft} = 2.6 + ((3.8 - 2.6) \times 1) = 3.8$$

It should be appreciated that by applying the different gain values to the signal above and below set point B as discussed above, the effective sensor sensitivity will be uniform or more substantially uniform as indicated by solid lines 72 and 74 in FIGS. 9 and 10 respectively, from point A to point C, thereby improving the responsiveness of the height control system when the crop divider snout tips are being run at or near on the ground surface.

It should also be appreciated that in order to ensure that modified signal magnitudes are within the acceptable input ranges for the comparator 56/controller 60 (e.g. between ranges between 0.5 volts and 4.5 volts), it may be necessary to shift the signal magnitudes. For example, if the slope of the signal voltage versus height in FIG. 8 was steeper due to a different sensing arm configuration such that the actual detected magnitude of the sensor at Set Point C was found to be 2.0 volts thereby resulting in a modified signal magnitude at Set Point C (Set Point C Magnitude (SPCM)) being 0.4 volts (i.e., 2.6−((2.6−2.0)×3.5), then it would be necessary to shift the signal plot upwards while maintaining the same slope to ensure that the header controller system would still receive this modified signal at Set Point C. One way to provide such a magnitude shift while maintaining the same slope is to set the actual magnitude of the signal at Set Point A (hereinafter the Set Point A Magnitude (SPAM)) to the maximum signal range and adjusting all the detected signals by this incremental difference. For example if the actual detected SPAM is 3.4 volts, all of the detected signal magnitudes may be adjusted upwardly by 1 volt such that the SPAM is reset to 4.4 volts (the maximum voltage accepted by most header control systems while allowing for a slight margin of error). The corresponding SPCM will thus be 1.4 volts (i.e., 0.4+1.0).

Although the preferred system and method of the present invention describes the pivot point 36 as the preestablished point on the header for determining header height above the ground surface, the present invention should not be construed as being limited to such an embodiment. Instead, it should be appreciated that Set Point B may be a reference to any point on the header or feeder house above the ground surface at which there is a discontinuity in the slope of the output signal. The purpose of which is simply to identify the magnitudes of the signal from the height sensor at Set Point B (wherever the reference point may be) so that the resulting output of the comparator 56/controller 60 can be modified as described above.

It is also important to note that some height sensors are configured to generate signals with opposite magnitudes than described above, i.e., signals of greater magnitude are generated at lower header heights and signals of lower magnitude are generated at higher header heights. For simplicity in describing the system and method of the present invention, it will be presumed that the height sensor generates lower magnitude signals below Set Point B than above Set Point B. However, the present invention is equally applicable to header height control systems in which the signal magnitudes are inverted as described above. Therefore any discussion in this specification or in the appended claims with respect to the signal magnitudes increasing above Set Point B or decreasing below Set Point B should be understood as being equally applicable to systems in which the signal magnitudes of the height sensors are switched above and below Set Point B.

It should also be understood that although the preferred system and method of the present invention is described and illustrated herein as being particularly adapted to corn headers, the present invention may also be utilized with other types of headers. It should also be understood that although specific reference is made herein to the use of rotational sensors in combination with height sensing arms, the system and method of the present invention is equally applicable to other height sensing systems that do not utilize a height sensing arm, including non-contact sensors, such as ultrasonic sensors.

The foregoing description is presented to enable one of ordinary skill in the art to make and use the invention and is provided in the context of a patent application and its requirements. Various modifications to the preferred embodiment of the system, and the general principles and features of the system and methods described herein will be readily apparent to those of skill in the art. Thus, the present invention is not to be limited to the embodiments of the system and methods described above and illustrated in the drawing figures, but is to be accorded the widest scope consistent with the spirit and scope of the appended claims.

The invention claimed is:

1. A method for improving the responsiveness of a header height control system during harvesting operations when the header is being operated at a height where the header's pivotable crop dividers begin, or are near to beginning, to pivot about their pivot points, said method comprising:
   operably mounting a height sensor to the header, said height sensor generating a signal variable in magnitude corresponding to changes in height relative to a ground surface;
   determining a magnitude of said generated signal where the header's pivotable crop dividers begin, or are near to beginning, to pivot about their pivot points (a "Set Point B Position");
   as the harvester traverses a field during harvesting operations, monitoring said generated signal magnitudes of said height sensor; and
   for said generated signal magnitudes indicating that said header is below said Set Point B Position, operably modifying those said signal magnitudes,
   whereby said modified signals improve responsiveness of the header height control system when the header is operated at a height where the header's pivotable crop dividers begin, or are near to beginning, to pivot about their pivot points.

2. The method of claim 1 wherein at about said Set Point B Position there is a discontinuity in a plot of said generated signal magnitudes for header heights from a high point (a "Set Point A Position") to a low point (a "Set Point C Position").

3. The method of claim 2 wherein said discontinuity is a change from a first slope to a second slope.

4. The method of claim 1 wherein said step of modifying said generated signal magnitudes indicating that said header is below said Set Point B Position includes operably applying a first gain value to said generated signal magnitudes.

5. The method of claim 1 further comprising:
   for said generated signal magnitudes indicating that said header is above said Set Point B Position, operably applying a second gain value to those said generated signal magnitudes.

6. The method of claim 5 wherein said first gain value is greater than said second gain value.

7. The method of claim 5 wherein said first gain value is between about one and ten times greater than said second gain value.

8. The method of claim 1 wherein said height sensor is a height sensing arm comprising a pivotable arm coupled to a rotation sensor.

9. The method of claim 1 wherein said height sensor is a non-contact sensor.

10. The method of claim 8 wherein said header is a corn header.

11. The method of claim 10 wherein said height sensing arm is disposed forwardly of said pivot point of said pivotable crop divider.

12. The method of claim 9 wherein said header is a corn header.

13. The method of claim 12 wherein said non-contact sensor is disposed forwardly of said pivot point of said pivotable crop divider.

14. The method of claim 1 further comprising:
   disposing at least one other sensor to operably automatically determine when the header is moved to said Set Point A Position, to said Set Point B Position and to said Set Point C Position.

15. The method of claim 14 wherein said at least one other sensor is a contact sensor.

16. The method of claim 14 wherein said at least one other sensor is a rotational sensor.

17. The method of claim 1 wherein said height sensor is a height sensing arm comprising a pivotable arm coupled to a rotation sensor.

18. The method of claim 1 wherein said height sensor is a non-contact sensor.

19. The method of claim 17 wherein said height sensing arm is disposed forwardly of said pivot point of said pivotable crop divider.

20. The method of claim 18 wherein said non-contact sensor is disposed forwardly of said pivot point of said pivotable crop divider.

21. A method for improving the responsiveness of a header height control system during harvesting operations when the header is being operated at a height where the header's pivotable crop dividers begin, or are near to beginning, to pivot about their pivot points, said method comprising:
mounting a height sensor on the header, said height sensor generating signal magnitudes that vary in relation to height above a surface;
moving the header above said surface between an elevated position (a "Set Point A Position"), a position at which the pivotable crop dividers begin, or are near to beginning, to pivot about their pivot points (a "Set Point B Position"), and a low position where said pivotable crop dividers are substantially pivoted about their pivot points (a "Set Point C Position");
determining said generated signal magnitude at said Set Point A Position (a "Set Point A Magnitude"), at said Set Point B Position (a "Set Point B Magnitude") and at said Set Point C Position (a "Set Point C Magnitude");
as the harvester traverses a field during harvesting operations, monitoring said generated signal magnitudes in relation to said Set Point B Magnitude; and
for said generated signal magnitudes indicating that said header is below said Set Point B Position, operably applying a first gain value to those said generated signal magnitudes to improve responsiveness of the header height control system when the header is operated at a height where the header's pivotable crop dividers begin, or are near to beginning, to pivot about their pivot points.

22. The method of claim 21 further comprising:
for said generated signal magnitudes indicating that said header is above said Set Point B Position, operably applying a second gain value to those said generated signal magnitudes.

23. The method of claim 22 wherein said first gain value is greater than said second gain value.

24. The method of claim 22 wherein said first gain value is between about one and ten times greater than said second gain value.

25. The method of claim 21 further comprising:
disposing at least one other sensor to operably automatically determine when the header is moved to said Set Point A Position, to said Set Point B Position and to said Set Point C Position.

26. The method of claim 25 wherein said at least one other sensor is a contact sensor.

27. The method of claim 25 wherein said at least one other sensor is a rotational sensor.

28. A method for improving the responsiveness of a control system for a harvester header when the header is being operated during harvesting operations with the header's pivotable crop divider snout at or near ground level, said method comprising:
mounting a height sensor forwardly of a pivot point of at least one pivotable crop divider snout on the header, said height sensor generating signal magnitudes that vary in relation to height above a surface;
moving the header above said surface to an elevated position (a "Set Point A Position"), to a position at which said at least one pivotable crop divider snout contacts, or is near to contacting, said surface (a "Set Point B Position"), to a position below said Set Point B Position (a "Set Point C Position") and;
determining said generated signal magnitude at said Set Point A Position (a "Set Point A Magnitude"), at said Set Point B Position (a "Set Point B Magnitude") and at said Set Point C Position (a "Set Point C Magnitude");
determining a slope of said generated signal from said Set Point B Magnitude to said Set Point A Magnitude and from Set Point B Magnitude to Set Point C Magnitude;
modifying said generated signal magnitudes with a gain value such that said slope of said generated signal from said Set Point B Magnitude to said Set Point C Magnitude approximates said slope of said generated signal from said Set Point B Magnitude to said Set Point A Magnitude, thereby improving the responsiveness of the control system for the harvester header when the header is being operated at or below said Set Point B Position.

29. The method of claim 28 further comprising:
disposing at least one other sensor to automatically determine when said header is moved to said Set Point A Position, to said Set Point B Position and to said Set Point C Position.

30. The method of claim 29 wherein said at least one other sensor is a contact sensor.

31. The method of claim 29 wherein said at least one other sensor is a rotational sensor.

32. The method of claim 29 wherein said Set Point A Magnitude, said Set Point B Magnitude and said Set Point C Magnitude are automatically recorded when said at least one other sensor determines when said header is moved to Set Point A Position, said Set Point B Position and said Set Point C Position.

33. The method of claim 28 wherein said height sensor is a height sensing arm comprising a pivotable arm coupled to a rotation sensor.

* * * * *